(12) United States Patent
Shin (10) Patent No.: US 7,336,439 B2
(45) Date of Patent: Feb. 26, 2008

(54) ACTUATOR HAVING ABSORPTION FILTER AND DISK DRIVE HAVING THE SAME

(75) Inventor: Sang-chul Shin, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 10/868,958

(22) Filed: Jun. 17, 2004

(65) Prior Publication Data

US 2005/0030664 A1  Feb. 10, 2005

(30) Foreign Application Priority Data

Aug. 7, 2003 (KR) .............. 10-2003-0054784

(51) Int. Cl.
*G11B 33/14* (2006.01)
(52) U.S. Cl. .................................. 360/97.02
(58) Field of Classification Search ............. None
See application file for complete search history.

(56) References Cited

U.S. PATENT DOCUMENTS

| 5,418,666 | A  | 5/1995 | Mihara et al. | 360/97.01 |
| 6,208,484 | B1 | 3/2001 | Voights | 360/97.02 |
| 6,362,937 | B1 | 3/2002 | Gibbs et al. | 360/256.1 |

FOREIGN PATENT DOCUMENTS

| JP | 9-115280 | | 5/1997 |
| JP | 2001-76478 | | 3/2001 |
| KR | 2005-017712 | * | 2/2005 |

OTHER PUBLICATIONS

Official Action issued by the Japanese Patent Office on Apr. 18, 2006 in the corresponding Japanese application.
European Search Report Communication issued by the European Patent Office on Jul. 19, 2007 in the corresponding European Patent Application No. 04016588.8-2210 with an Abstract attached thereto (4 pages).

* cited by examiner

*Primary Examiner*—David Davis
(74) *Attorney, Agent, or Firm*—Staas & Halsey LLP (57) ABSTRACT

An actuator of a disk drive to move a read/write head for recording and reproducing data to a predetermined position on a disk, the actuator includes a swing arm rotatably installed inside the disk drive, a suspension coupled with a leading end portion of the swing arm and supporting a slider on which the head is mounted, and an absorption filter attached with one side of the swing arm to confront an airflow in a predetermined direction according to rotation of the disk, and to absorb foreign materials in the airflow.

23 Claims, 9 Drawing Sheets
(1 of 9 Drawing Sheet(s) Filed in Color)

ACTUATOR HAVING ABSORPTION FILTER AND DISK DRIVE HAVING THE SAME

CROSS-REFERENCE TO RELATED APPLICATION

This application claims the priority of Korean Patent Application No. 2003-54784, filed on Aug. 7, 2003, in the Korean Intellectual Property Office, the disclosure of which is incorporated herein in its by reference.

BACKGROUND OF THE INVENTION

1. Field of the Invention

The invention relates to a disk drive, and more particularly, to an actuator having an absorption filter absorbing foreign materials in a disk drive and a disk drive having the same.

2. Description of the Related Art

Hard disk drives (HDDs), which are data storage devices used for computers, use read/write heads to reproduce or record data with respect to a disk. In the HDD, the read/write head performs its functions while being moved by an actuator to a desired position, wherein the read/write head is lifted to a predetermined height from a recording surface of a rotating disk.

Figure 1:
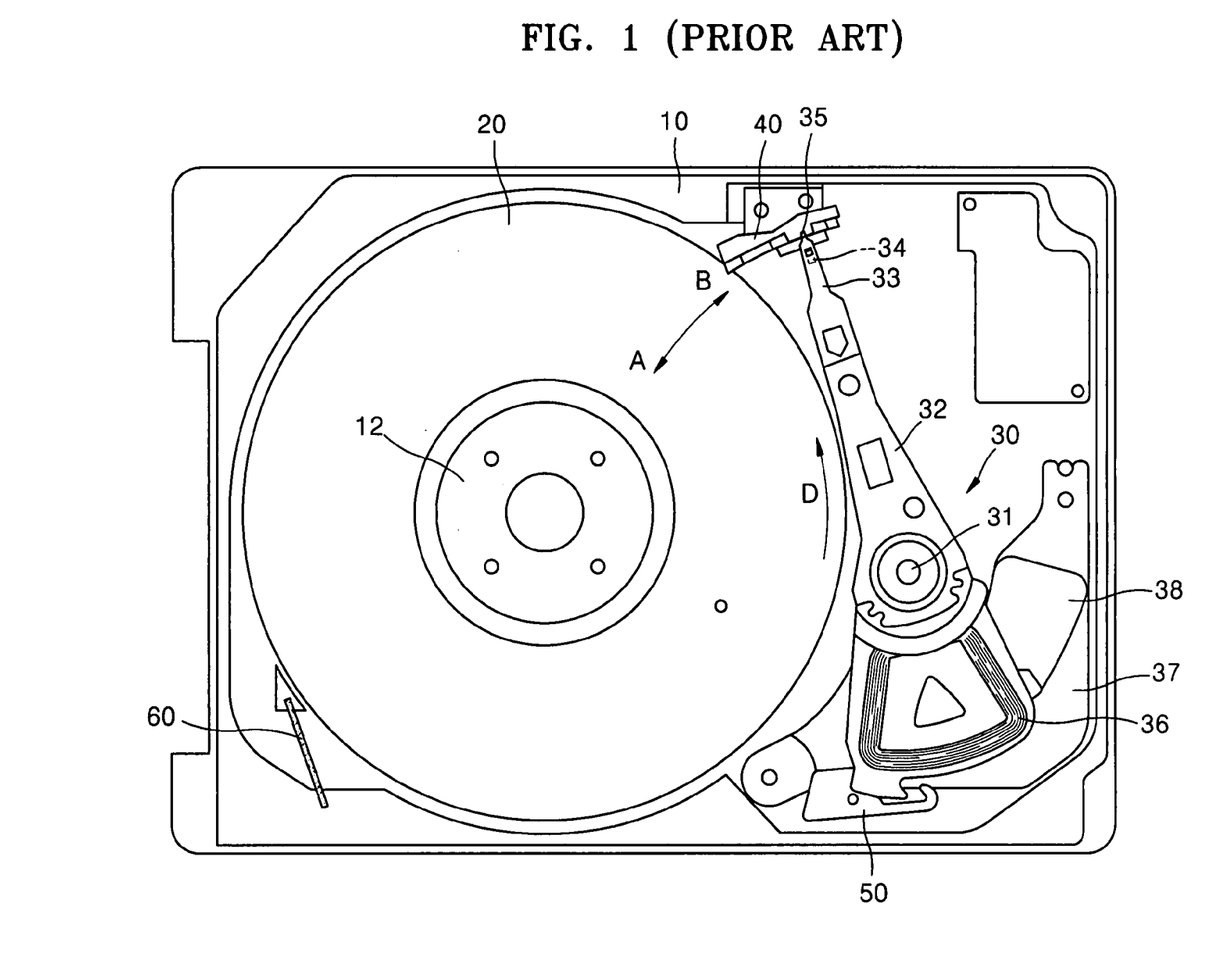
FIG. 1 is a plan view illustrating the configuration of a conventional hard disk drive.
Figure 2:
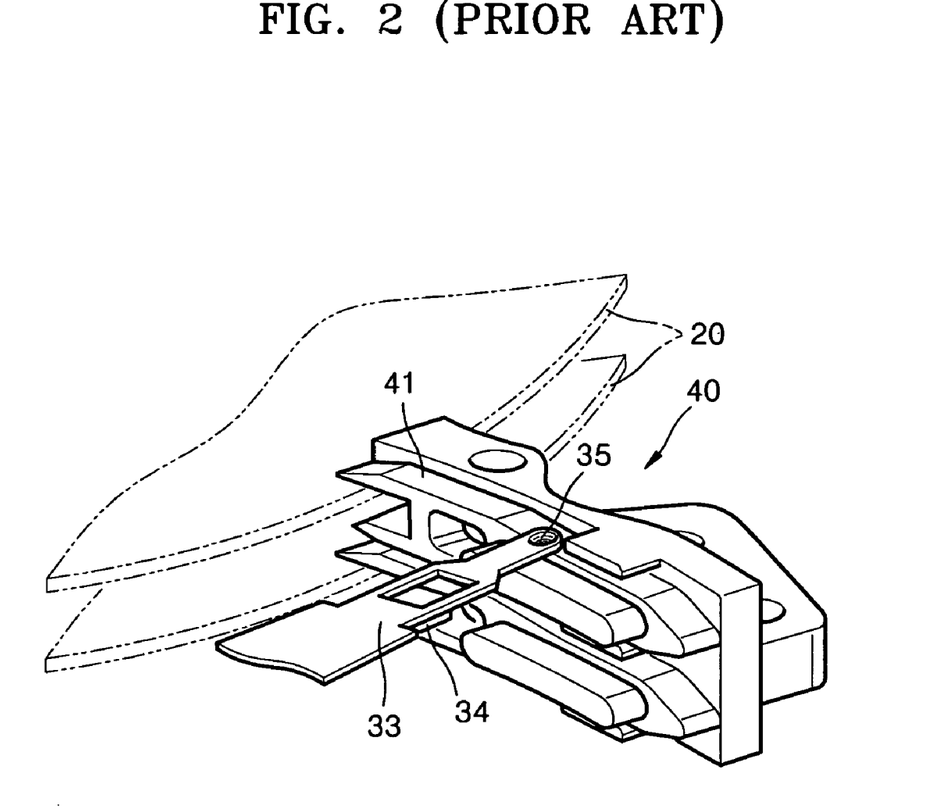
FIG. 2 is a magnified perspective view illustrating a ramp and a suspension portion of an actuator shown in FIG. 1.

FIG. 1 is a plan view illustrating the configuration of a conventional hard disk drive. FIG. 2 is a magnified perspective view illustrating a ramp and a suspension portion of the actuator shown in FIG. 1. Referring to FIGS. 1 and 2, a conventional hard disk drive includes a spindle motor 12 installed on a base plate 10. A disk 20, which is one or more disks, is installed on the spindle motor 12. An actuator 30 is installed to move a rear/write head (not shown) for reproducing and recording data to a predetermined position on the disk 20. The actuator 30 includes a swing arm 32 rotatably coupled to a pivot bearing 31 installed on the base plate 10, a suspension 33 installed at one end portion of the swing arm 32 and supporting a slider 34, on which the head is mounted, toward a surface of the disk 20 to be elastically biased, and a voice coil motor (VCM) to rotate the swing arm 32. The voice coil motor includes a VCM coil 36 coupled to the other end portion of the swing arm 32, a lower yoke 37 installed below the VCM coil 36, and a magnet 38 attached to an upper surface of the lower yoke 37. Although not shown in the drawing, the voice coil motor may further include an upper yoke installed above the VCM coil 36 and a magnet attached to a lower surface of the upper yoke.

The voice coil motor having the above configuration is controlled by a servo control system to rotate the swing arm 32 in a direction following the Fleming's left hand rule by the interaction between current applied to the VCM coil 36 and a magnetic field formed by the magnet 38. That is, when the power of the hard disk drive is on and the disk 20 starts to rotate in a direction D, the voice coil motor rotates the swing arm 32 counterclockwise, that is, in a direction A, to move the slider 34 on which the head is mounted toward a position above the recording surface of the disk 20. The slider 34 is lifted to a predetermined height, for example, about 13 nm, from the surface of the disk 20 by a lift force generated by the rotating disk 20. In this state, the rear/write head mounted on the slider 34 reproduces or records data with respect to the recording surface of the disk 20.

When the hard disk drive does not operate, (that is, the disk 20 stops rotating) the head is parked at a position out of the recording surface of the disk 20 so that the head does not collide against the recording surface of the disk 20. The head parking system may be employed using a contact start stop (CSS) method or a ramp loading method. In the CSS method, a parking zone where data is not recorded is provided at or near an inner circumferential side of the disk 20 and the head is parked in the parking zone in a contact or near contact manner. However, in a head parking system adopting the CSS method, since the parking zone needs to be provided at or near the inner circumferential side of the disk 20, data storage space is reduced. Thus, to meet the recent demands of a higher data recording density, a head parking system adopting the ramp loading method is widely used because it can secure a larger data storage space.

In the ramp loading method, a ramp 40 is installed at the outside of the disk 20 and the head is parked on the ramp 40. To this end, the suspension 33 has an end-tab 35 extended therefrom, which contacts a support surface 41 of the ramp 40. The end-tab 35 generally has a shape convex toward the support surface 41 to reduce a contact area between the end-tab 35 and the support surface 41 of the ramp 40.

When the power of the hard disk drive is off and the disk 20 stops rotating, the voice coil motor rotates the swing arm 32 clockwise, (that is, in a direction B). Accordingly, the end-tab 35 is unloaded from the disk 20 and moved to the support surface 41 of the ramp 40. In contrast, when the power of the hard disk drive is on and the disk 20 starts to rotate, the end-tab 35 is unloaded from the support surface 41 of the ramp 40 and moved above the disk 20 by the rotation of the swing arm 32.

In a state in which the head is parked on the ramp 40, when an external impact or a vibration is applied to the disk drive, the actuator 30 rotates and moves toward the recording surface of the disk 20 from the ramp 40. In this case, the head contacts the recording surface of the disk 20 so that the read/write head and the recording surface of the disk 20 may be damaged. Thus, when the disk 20 stops rotating and the head is parked on the ramp 40, the actuator 30 should be locked at a predetermined position so as to not rotate. For this purpose, an actuator latch 50 is provided.

Figure 3:
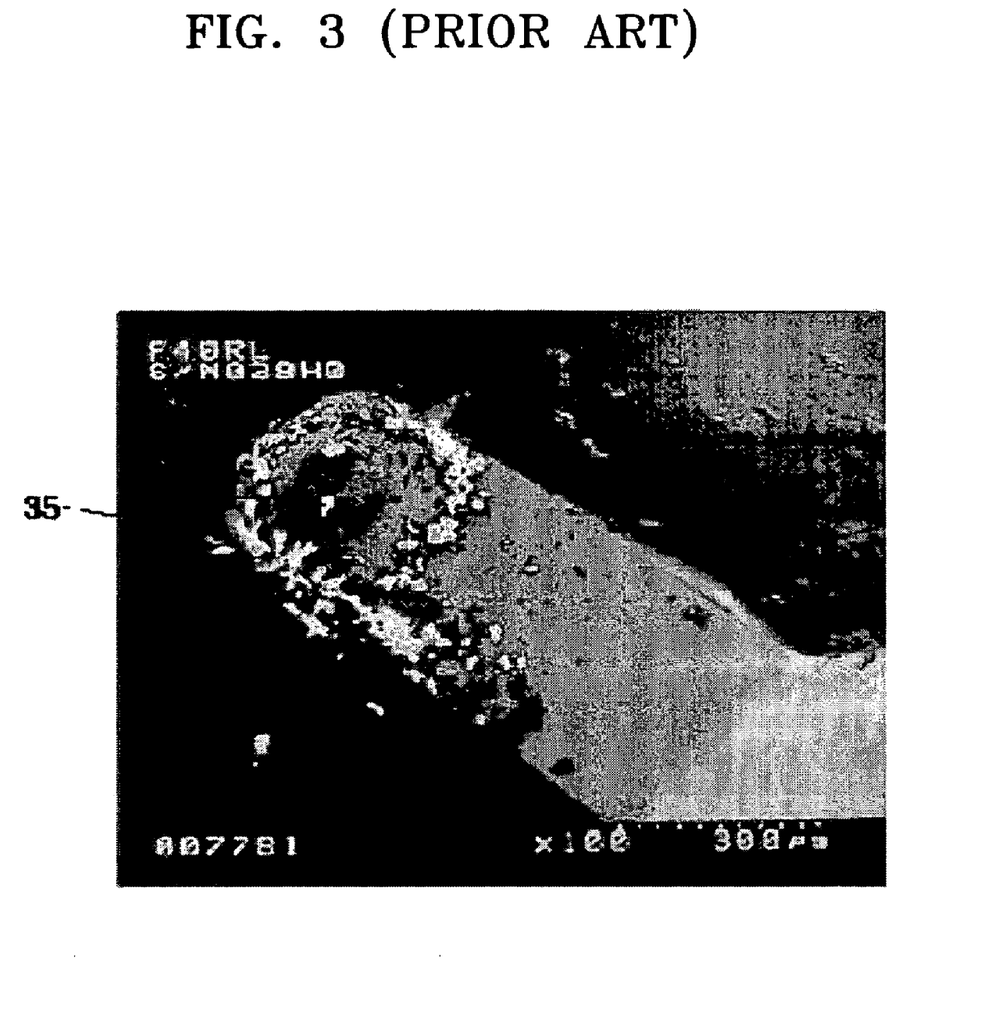
FIG. 3 is a microphotograph showing particles adhering on and around the end-tab shown in FIG. 2.

Foreign materials, such as particles or gas, are generated in the hard disk drive having the above configuration. For example, when the end-tab 35 is moved toward the disk 20 or the support surface 41 of the ramp 40, a sliding friction is generated between the end-tab 35 and the support surface 41 of the ramp 40. After repeating such movements, the support surface 41 of the ramp 40 (often formed of plastic) is abraded so that particles are generated. FIG. 3 shows particles adhering on and around the end-tab 35. When the head lifted above the surface of the disk 20 collides against the surface of the disk 20 by an external impact or vibration, particles are generated due to the friction and abrasion between the head and the disk 20. Also, the hard disk drive has many parts that are electrodeposition-coated or nickel-coated and made of plastic, such as the ramp 40. In a burn-in process to prove servo compensation, defect free, and head performance, or when a particular time passes after the disk drive operates, the disk drive is in a high temperature state. In the high temperature state, gas is generated from the parts of the disk drive. Gas molecules perform Brownian motions in the disk drive and chemically react with one another or collide against one another, such that particles having a size of several hundred nanometers may be formed.

The particles flow in the hard disk drive following the airflow generated by the rotation of the disk 20. The size of the flowing particle varies from several nanometers to several hundred nanometers. A particle larger than an interval between the head and the disk 20, that is, a flying height of the head, collides with the head and changes the posture of the head. Accordingly, the head contacting the disk 20 scratches the recording surface of the disk 20 and damages a magnetic signal. Also, a read/write sensor of the head is damaged by the collision between the particle and the head, thereby causing the read/write sensor not to function properly. In addition, particles having a size smaller than the flying height of the head intrude between the head and the surface of the disk 20, thereby damaging the head or scratching the surface of the disk.

Ultra-light, high capacity, and compact hard disk drives have recently been developed. Accordingly, the storage capacity of a disk is greatly increased. For example, the track density and the track width of the disk is presently about 90,000 TPI (track per inch) and about 11µ inch, respectively. It is expected that the track density and the track width of the disk will be 130,000 TPI and 7.7µ inch, respectively, in the future. Consequently, the flying height of the head is gradually decreased so that the head is easily damaged by tiny particles and the magnetic signal on the disk surface is easily damaged by small scratches.

Thus, to solve the above problems, foreign materials such as particles or gas generated in the disk drive need to be collected and removed. Conventionally, as shown in FIG. 1, a circulation filter 60 is provided at a corner of the base plate 10 to filter foreign materials, such as particles, included in the airflow in the hard disk drive. However, the circulation filter 60 does not have a satisfactory filtering effect.

Figure 4:
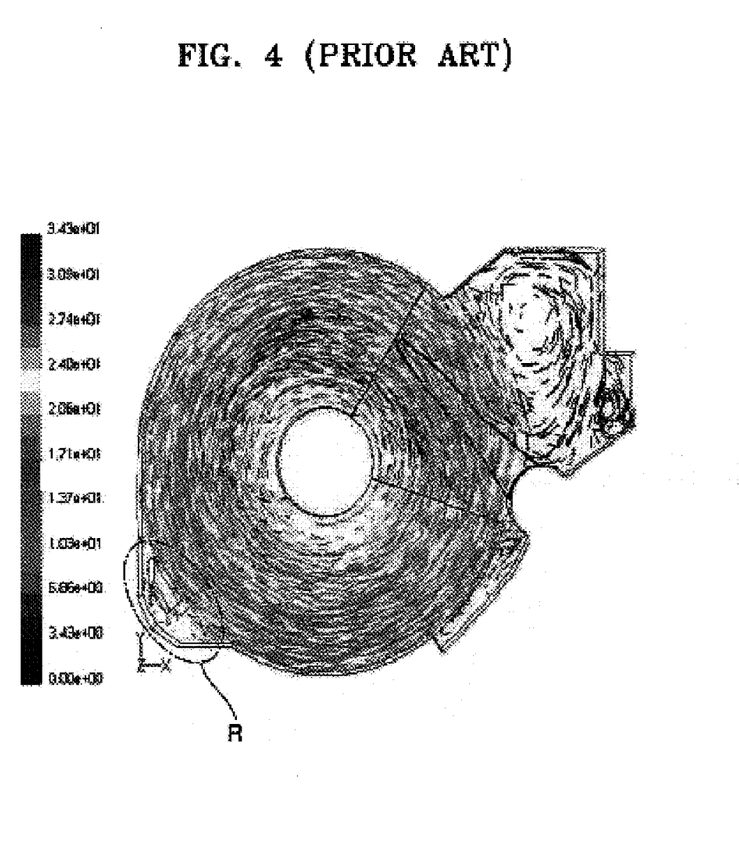
FIG. 4 is a view showing the result of simulation of the distribution of flow speed of particles on and around the surface of a rotating disk in the conventional hard disk drive shown in FIG. 1.

FIG. 4 shows the result of simulation of the distribution of flow speed of particles on and around the surface of a rotating disk in the conventional hard disk drive shown in FIG. 1. Referring to FIG. 4, an airflow is formed by the rotation of a disk in the disk drive. Particles in the disk drive are moved together with the airflow. The flow speed of the particles is proportional to the flow speed of the air. Accordingly, the flow speed of the particles is faster as the particles are located closer to the outer circumferential side of the disk while the flow speed of the particles is slower as the particles are located closer to the inner circumferential side of the disk. When the conventional circulation filter 60 is used, there is nearly no flow of the particles and the particles hardly exist in a region R where the conventional circulation filter 60 is disposed. Such low speed or non-flow of the particles at the region R indicates that the air is hardly input to the circulation filter 60. Therefore, the conventional circulation filter does not work properly in collecting the particles.

In order for the circulation filter 60 to exert its maximum function of collecting the particles, there needs to be provided a structure to guide the airflow toward the circulation filter or move the position of the circulation filter 60. To guide the airflow toward the circulation filter 60, the interval between the base plate 10 and the disk 20 needs to be increased such that the air reaches the circulation filter 60. However, such a change causes a change in the airflow speed in a circumferential direction and up/down directions of the disk 20, thereby altering a pressure applied to the surface of the disk 20, causing the disk 20 to vibrate. The vibration increases the track misregistration (TMR) so that performance of the hard disk drive is negatively affected. As a result, changing the structure of the base plate 10 to guide the airflow toward the circulation filter 60 is not a desirable solution.

Figure 5:
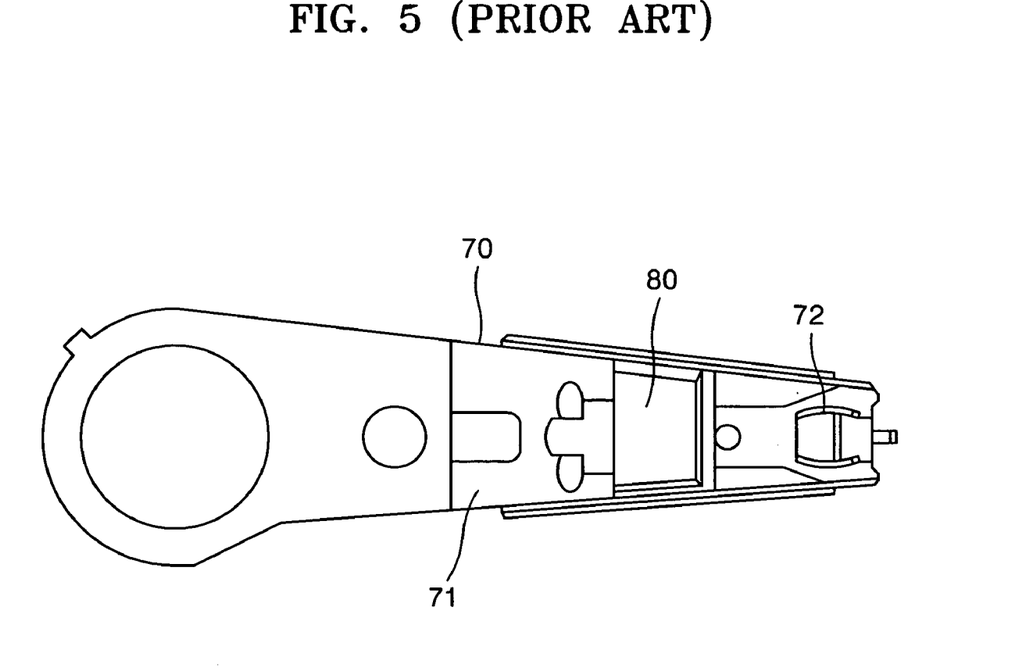
FIG. 5 is a view illustrating a conventional actuator of a magnetic disk apparatus.

FIG. 5 shows an actuator of a magnetic disk apparatus disclosed in Japanese Patent Application Publication No. 2001-76478. Referring to FIG. 5, a slider 72 on which a head is mounted and a gas absorption member 80 are attached to a swing arm 71 of an actuator 70. The gas absorption member 80 is attached to a surface of the swing arm 71 facing the disk 20 to absorb contaminants on a surface of the hard disk. However, the thickness of the gas absorption member 80 is limited since it is attached to the surface of the swing arm 71 facing the disk 20. That is, the thickness of the gas absorption member 80 cannot be greater than the interval between the swing arm 71 and the disk 20 and thicker than the thickness of the slider 72. Thus, since the gas absorption member 80 adhering to the surface of the swing arm 71 facing the disk has a very small thickness, it can collect gas having a size of several nanometers but cannot easily collect particles having a size of several hundred nanometers. Also, since the gas absorption member 80 is arranged parallel to a direction of airflow, an efficiency in collecting gas and particles is low.

The gas absorption member 80 can be applied to only the actuator 70 having a structure in which a plurality of swing arms having a shape of a thin plate are stacked. However, when a plurality of swing arms constitute a signal block having an "E" shape, since the interval between the swing arms is narrow, it is difficult to attach the gas absorption member on the surface of the swing arm facing the disk.

SUMMARY OF THE INVENTION

To solve the above and/or other problems, an aspect of the invention provides an actuator having an absorption filter arranged to confront, or impede, the airflow in a certain direction and effectively absorbing foreign materials in a disk drive, and a disk drive having the same.

According to another aspect of the invention, an actuator of a disk drive to move a read/write head for recording and reproducing data to a predetermined position on a disk comprises a swing arm rotatably installed inside the disk drive, a suspension coupled to a leading end portion of the swing arm and supporting a slider on which the head is mounted, and an absorption filter attached to one side of the swing arm to confront an airflow in a predetermined direction according to rotation of the disk, to absorb foreign materials in the airflow.

According to an aspect of the invention, the absorption filter adheres to one side surface of the swing arm.

According to an aspect of the invention, a support portion attached to at least one of upper and lower surfaces of the swing arm and supporting the absorption filter protrudes on a rear surface of the absorption filter, and the height of the absorption filter is greater than that of the side surface of the swing arm.

According to an aspect of the invention, a surface of the absorption filter confronting the airflow in the direction is either perpendicular to a surface of the disk, inclined with respect to a surface of the disk, or streamlined and curved.

According to another aspect of the invention, a disk drive having a spindle motor, at least one disk installed on the spindle motor, an actuator to move a read/write head for recording and reproducing data to a predetermined position on the disk, and a voice coil motor to rotate the actuator comprises a swing arm rotatably installed inside the disk drive, a suspension coupled to a leading end portion of the swing arm and supporting a slider on which the head is mounted, and an absorption filter attached to one side of the swing arm to confront an airflow in a predetermined direction according to rotation of the disk, to absorb foreign materials in the airflow.

Additional aspects and/or advantages of the invention will be set forth in part in the description which follows and, in part, will be obvious from the description, or may be learned by practice of the invention.

BRIEF DESCRIPTION OF THE DRAWINGS

The patent or application file contains at least one drawing executed in color. Copies of this Patent or patent application publication with color drawing(s) will be provided by the U.S. Patent and Trademark Office upon request and payment of the necessary fee. The above and/or other features and advantages of the invention will become more apparent and more readily appreciated by describing in detail embodiments thereof with reference to the accompanying drawings in which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the invention by referring to the figures.

Figure 6:
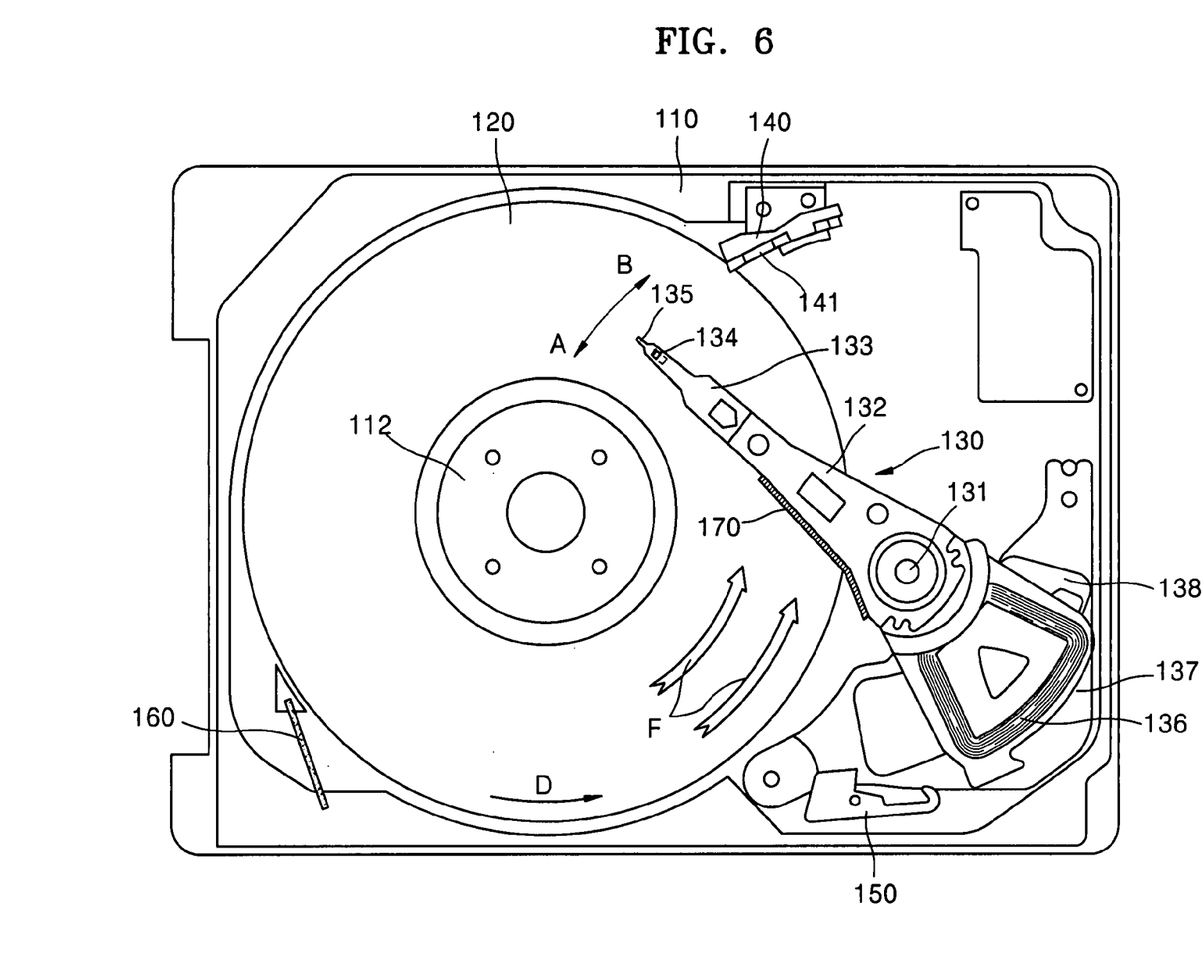
FIG. 6 is a plan view illustrating a hard disk drive adopting an actuator having an absorption filter according to an embodiment of the invention.
Figure 7:
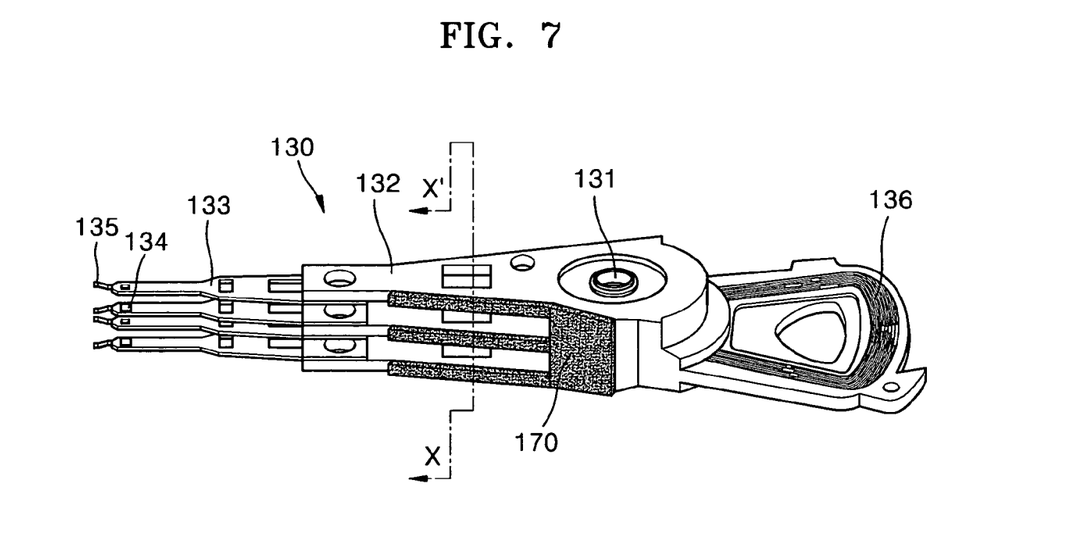
FIG. 7 is a perspective view illustrating the actuator having the absorption filter according to an embodiment of the invention.

Referring to FIGS. 6 and 7, a hard disk drive according to an embodiment of the invention includes a spindle motor 112, at least one disk 120, an actuator 130 having an absorption filter 170, and a voice coil motor. The spindle motor 112 is installed on a base plate 110 of the hard disk drive. At least one disk 120 is installed on a hub of the spindle motor 112 and rotated with the hub. The actuator 130 moves a read/write head for recording and reproducing data to a predetermined position on the disk 120, and includes a swing arm 132, a slider 134 on which the head is mounted, a suspension 133, and an absorption filter 170.

The swing arm 132 is rotatably coupled to a pivot bearing 131 installed on the base plate 110. The suspension 133 is coupled with a leading end portion of the swing arm 132 and supports the slider 134 toward a surface of the disk 120 to be elastically biased. The absorption filter 170 is attached with one side of the swing arm 122 to confront the airflow in a direction F according to the rotation of the disk 120 and absorbs foreign materials in the airflow therein. Thus, the absorption filter 170 is impacted by the airflow moving in a direction parallel to a recording surface of the disk 120. As shown, the absorption filter 170 is on a side that does not face the disk 120 (i.e., the absorption filter 170 is not entirely parallel to a surface of the disk 120).

The voice coil motor (VCM) provides a drive force to rotate the actuator 130 and includes a VCM coil 136 coupled with a rear end portion of the swing arm 132, a lower yoke 137 installed below the VCM coil 136, and a magnet 138 attached with an upper surface of the lower yoke 137. Although not shown, the voice coil motor may further include an upper yoke installed above the VCM coil 136 and a magnet attached to a lower surface of the upper yoke. The voice coil motor having the above configuration is controlled by a servo control system to rotate the swing arm 132 in a direction following the Fleming's left hand rule by the interaction between current applied to the VCM coil 136 and a magnetic field formed by the magnet 138.

The disk drive has a head parking system in a ramp loading method to park the head at a position out of a recording surface of the disk 120 so that, when the rotation of the disk 120 is stopped, the head does not collide against the recording surface of the disk 120. In detail, a ramp 140 is installed at the outside of the disk 120 and an end-tab 135 supported on a support surface 141 of the ramp 140 by contact the same is extended from an end portion of the suspension 133 of the actuator 130. When the rotation of the disk 120 stops, the actuator 130 is rotated in a direction B by the voice coil motor. Accordingly, the end-tab 135 of the actuator 130 is parked on the support surface 141 of the ramp 140. The end-tab of the actuator may be parked anywhere outside of the recording surface of the disk. However, it is understood that the ramp 140 need not be used in all aspects of the invention.

Also, an actuator latch 150 is provided in the disk drive to lock the actuator 130 such that the activator is not rotated by an external impact or vibration applied to the disk drive when the head is parked on the ramp 140 or located outside of the recording surface of the disk.

Foreign materials (not shown), such as particles or gas, are generated in or introduced to the disk drive having the above configuration. The foreign materials damage the surface of the disk 120 and the head and negatively impact the performance of the disk drive.

To solve the above problem, the actuator 130 has the absorption filter 170 to absorb the foreign materials. The absorption filter 170 is attached with one side of the swing arm 132 of the actuator 130 to confront the airflow in the direction F according to the rotation of the disk 120. However, it is understood that the absorption filter 170 may also be attached to other sides of the swing arm 132, or to multiple sides of the swing arm 132.

When the power of the disk drive is on and the disk 120 starts to rotate in a direction D, the voice coil motor rotates the actuator 130 counterclockwise (that is, in a direction A). Accordingly, the swing arm 132 and the absorption filter 170 are disposed on the disk 120. Simultaneously, airflow is formed by the rotation of the disk 120 and the airflow has a component in the direction F in which the disk 120 rotates. Since the absorption filter 170 is arranged on at least one side non-parallel with the direction F to confront the airflow in the direction F, foreign materials (such as particles or gas included in the airflow) are likely to contact the surface of the absorption filter 170. Thus, collecting the foreign materials by the absorption filter 170 is more efficient.

In the actuator 130 according to the aspect of the invention, as shown in FIG. 7, a plurality of the swing arms 132 can be provided according to the number of disks. The plurality of swing arms 132 is configured in a block having an "E" shape, as shown in FIG. 7, but can be otherwise shaped. In this case, each of the swing arms 132 has a relatively large thickness of about 1 mm. The side surface of a portion of each of the swing arms 132 close to the pivot bearing 131 makes a relatively large plane. The absorption filter 170 is attached with the side surface of the swing arm 132. For example, the absorption filter 170 can firmly adhere with the side surface of the swing arm 132 by using an adhesive. The side surface of the swing arm 132 to which the absorption filter is attached is the surface confronting the airflow in the direction F according to the rotation of the disk 120. Since the shape or configuration of the swing arm 132 does not need to be changed in order to attach the absorption filter 170, the absorption filter 170 can be applied with the existing actuator.

Also, since the absorption filter 170 is attached with the side surface of the swing arm 132, there is no possibility of interfering with the disk 120 so that the absorption filter 170 may have a relatively large thickness of (for example, one through several millimeters). Thus, the absorption filter 170 has a merit of easily absorbing particles having a size of not only several nanometers, but also several hundred nanometers.

While not required in all aspects of the invention, the absorption filter 170 typically has a buffering feature. Thus, since the absorption filter 170 is attached with the swing arm 130, the vibration of the actuator 130 is further reduced by a damping action of the absorption filter 170.

In addition to the absorption filter 170 attached to the swing arm 132 of the actuator 130, a circulation filter 160 may be provided in the disk drive, which is installed at a corner of the base plate 110 and filters particles included in the airflow inside the disk drive. Moreover, the absorption filter 80 shown in FIG. 5 can be additionally added to account for airflows perpendicular to the disk 120.

FIGS. 8A through 8E are partially enlarged sectional views of an actuator taken along line X-X' of FIG. 7, which show a variety of shapes of the absorption filter 170. First, referring to FIG. 8A, a surface 171 of the absorption filter 170 confronting the airflow in the direction F is perpendicular to the surface of the disk 120: In this case, since the surface 171 of the absorption filter 170 makes a right angle to the direction F of the airflow generated by the rotation of the disk 120, a possibility that the foreign materials included in the airflow inside the disk drive collide the surface 171 of the absorption filter 170 increases. Thus, an efficiency in collecting foreign materials by the absorption filter 170 increases. Also, the shape of the absorption filter 170 can be simply and easily manufactured.

Figure 8A:
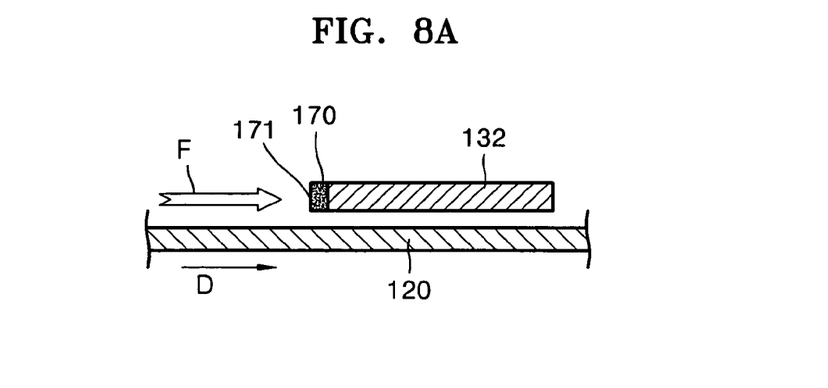
FIGS. 8A through 8E are partially magnified sectional views of the actuator taken along line X-X' of FIG. 7, showing various shapes of the absorption filter.
Figure 8B:
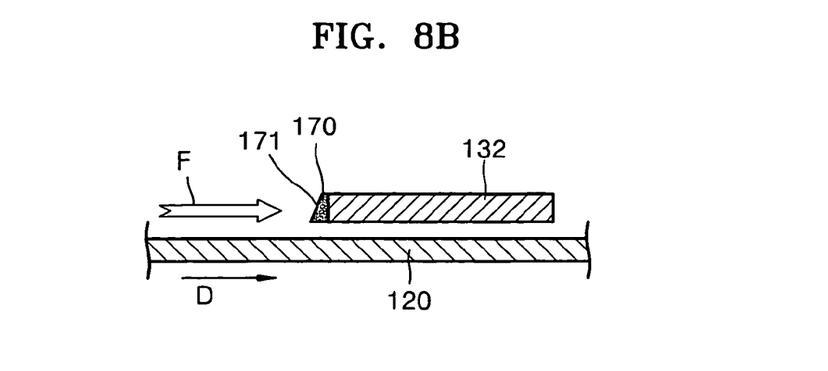
Figure 8C:
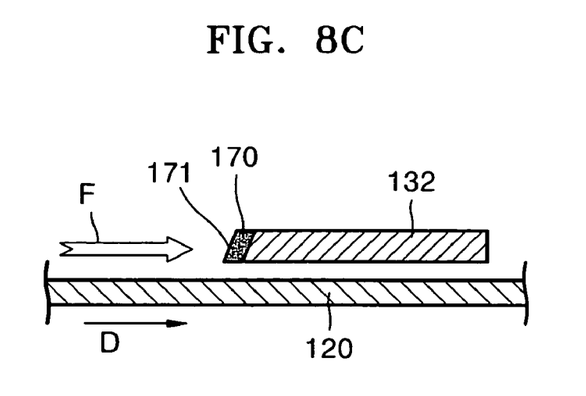

Referring to FIGS. 8B and 8C, the surface 171 of the absorption filter 170 confronting the airflow in the direction F can be formed inclined to the surface of the disk 120. In detail, as shown in FIG. 8B, the side surface of the swing arm 132 to which the absorption filter 170 is attached is perpendicular to the surface of the disk 120 while only the surface 171 of the absorption filter 170 is inclined. Referring to FIG. 8C, the side surface of the swing arm 132 is inclined to the surface of the disk 120 while the absorption filter 170 has a uniform thickness. In this case, when the absorption filter 170 having a uniform thickness is attached to the inclined side surface of the swing arm 132, the surface 171 of the absorption filter 170 is inclined to the surface of the disk 120.

Figure 8D:
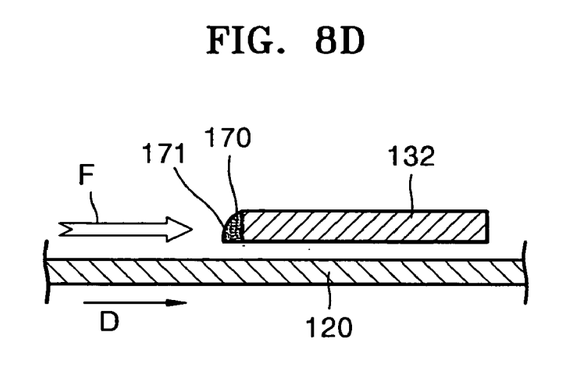
Figure 8E:
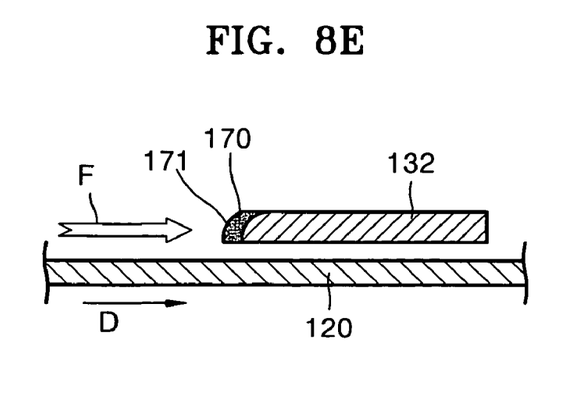

Referring to FIGS. 8D and 8E, the surface 171 of the absorption filter 170 confronting the airflow in the direction F can be formed inclined and curved to the surface of the disk 120. In detail, as shown in FIG. 8D, the side surface of the swing arm 132 to which the absorption filter 170 is attached is perpendicular to the surface of the disk 120 while only the surface 171 of the absorption filter 170 is inclined and curved. Referring to FIG. 8E, the side surface of the swing arm 132 is inclined and curved to the surface of the disk 120 while the absorption filter 170 has a uniform thickness. In this case, when the absorption filter 170 having a uniform thickness is attached to the inclined-in-a-curve side surface of the swing arm 132, the surface 171 of the absorption filter 170 is inclined and curved to the surface of the disk 120. According to the absorption filter 170 having the shapes shown in FIGS. 8B through 8E, since the air flows smoothly around the absorption filter 170, the generation of vibration of the disk 120 due to a vortex is reduced or restricted. While the absorption filter 170 is shown as being thinner as a function of distance, it is understood that the absorption filter 170 can have an increasing thickness as a function of distance from the disk 120.

Figure 9:
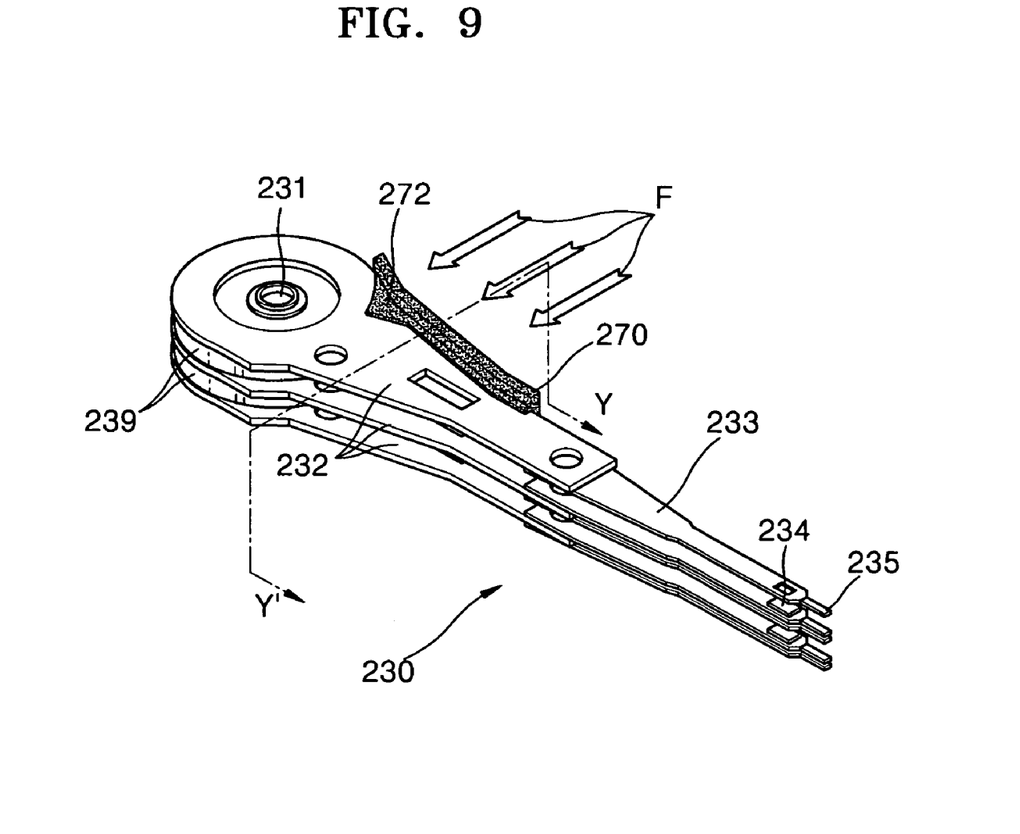
FIG. 9 is a perspective view illustrating an actuator having an absorption filter according to an embodiment of the invention.
Figure 10:
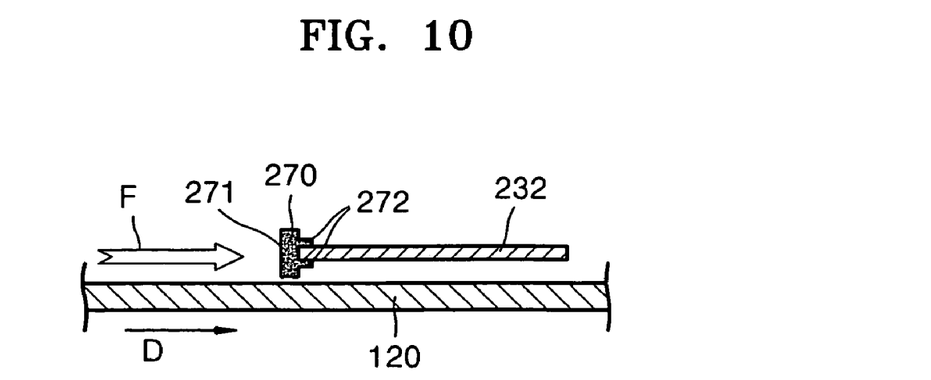
FIG. 10 is a partially magnified sectional view of the actuator taken along line Y-Y' of FIG. 9.

FIG. 9 is a perspective view illustrating an actuator having an absorption filter 270 according to an aspect of the invention. FIG. 10 is a partially magnified sectional view of the actuator taken along line Y-Y' of FIG. 9. Referring to FIGS. 9 and 10, the actuator 230 includes a swing arm 232 rotatably coupled with a pivot bearing 231, a slider 234 on which a read/write head is mounted, a suspension 233 coupled to a leading end portion of the swing arm 232 and supporting the slider 234, and the absorption filter 270 to absorb foreign materials in the flowing air. An end-tab 235 is provided at the leading end portion of the suspension 233.

In the actuator 230, a plurality of the swing arms 232 can be provided according to the number of the disk 220. Each of the swing arms 232 has a thin plate shape. The swing arms 232 are deposited with a spacer 239 interposed therebetween. The swing arm 232 may be formed of a stainless steel plate having a thin thickness of about 0.2 mm so that the height of the side surface thereof is low. The swing arm 232 may be formed of other materials having thin thickness and low height. In contrast, the interval between the swing arm 232 and the disk 120 of the second aspect of the invention is larger than that in the first aspect of the invention.

Because the height of the side surface of the swing arm 232 (that is, the height of the side surface confronting the airflow in the direction F according to the rotation of the disk 120) is low, attaching the absorption filter 270 to the side surface of the swing arm 232 may not provide a sufficient attachment strength. Thus, in the in the shown absorption filter 270, two support portions 272 protrude from a rear surface of the absorption filter 270 and attach to an upper surface and a lower surface of the swing arm 232 to support the absorption filter 270. Preferably, an attachment area between the support portions 272 and the swing arm 232 is as large as possible so as to have a sufficient attachment strength to support the absorption filter 270. Alternatively, a single support portion may be formed so as to be attached to one of the upper and lower surfaces of the swing arm 232.

Consequently, the absorption filter 270 may be firmly supported by the support portions 272 attached to the swing arm 232 in a wider area. Also, similar to the aspect of the invention shown in FIGS. 6 through 8E, since the shape or configuration of the swing arm 232 does not need to be changed to attach the absorption filter 270, the absorption filter 270 can be simply applied with the existing actuator 230. Since the interval between the swing arm 232 and the disk 120 increases, the height of the absorption filter 270 can be greater than that of the side surface of the swing arm 232. Thus, since a surface 271 of the absorption filter 270 confronting the airflow in the direction F has a sufficient height, a foreign material collecting area increases.

Further, in the actuator 230 having a plurality of the swing arms 232 each having the shape of a thin plate are deposited, the absorption filter 270 may be attached to one side of the swing arm 232 in order to confront the airflow according to the rotation of the disk 120. Thus, collecting foreign materials by the absorption filter 270 is more efficient.

In the actuator 230, the surface 271 of the absorption filter 270 can be formed approximately perpendicular to the surface of the disk 120. The surface 271 of the absorption filter 270 may be formed inclined to the surface of the disk 120, inclined or curved thereto, as shown in FIGS. 8B and 8E.

Also, the absorption filter 270 easily absorbs relatively large particles having a size of several hundred nanometers, as in the first aspect of the invention. In addition, the absorption filter 270 reduces vibrations of the actuator 230 by a damping action thereof.

While described in terms of a hard disc drive, it is understood that the present invention can be used in optical drives, floppy disk drives, magnetic disk drives, or in any mechanism in which foreign materials are to be removed.

As described above, in the actuator of a disk drive according to an aspect of the invention, since the absorption filter is arranged at the side surface of the swing arm to confront the airflow in a predetermined direction, not only is collecting foreign materials inside the disk drive by the absorption filter more efficient, but relatively large particles having a size of several hundred nanometers can also be collected. Thus, the disk surface and head can be prevented from being damaged by the foreign materials, thereby improving the performance and reliability of the disk drive.

Furthermore, the vibration of the actuator can be reduced by the damping action of the absorption filter attached to the swing. The invention can be easily applied to an actuator in which a plurality of swing arms each having a thin plate shape are deposited.

Although in the above description the invention is described based on a ramp loading type hard disk drive, the invention is not limited thereto. The invention can be applied to a CSS type hard disk drive.

While this invention has been particularly shown and described with reference to preferred embodiments thereof, it will be understood by those skilled in the art that various changes in form and details may be made therein without departing from the spirit and scope of the invention as defined by the appended claims and their equivalents.

What is claimed is:

1. An actuator of a disk drive to move a read/write head for recording and reproducing data to a predetermined position on a disk, the actuator comprising:
   a swing arm rotatably installed inside the disk drive;
   a suspension coupled with a leading end portion of the swing arm and supporting a slider with which the read/write head is mounted; and
   an absorption filter attached with one side of the swing arm to confront an airflow in a predetermined direction according to rotation of the disk, and to absorb foreign materials in the airflow which is generated,
   wherein the absorption filter comprises a support portion attached with at least one of upper and lower surfaces of the swing arm and supporting the absorption filter and which protrudes from a rear surface of the absorption filter.

2. The actuator as claimed in claim 1, wherein the absorption filter adheres with one side surface of the swing arm.

3. The actuator as claimed in claim 1, wherein a height of the absorption filter is greater than a height of the side surface of the swing arm.

4. The actuator as claimed in claim 1, wherein a surface of the absorption filter confronting the airflow in the predetermined direction is perpendicular to a surface of the disk.

5. An actuator of a disk drive to move a read/write head for recording and reproducing data to a predetermined position on a disk, the actuator comprising:
   a swing arm rotatably installed inside the disk drive;
   a suspension coupled with a leading end portion of the swing arm and supporting a slider with which the read/write head is mounted; and
   an absorption filter attached with one side of the swing arm to confront an airflow in a predetermined direction according to rotation of the disk, and to absorb foreign materials in the airflow which is generated,
   wherein a surface of the absorption filter confronting the airflow in the predetermined direction is inclined with respect to a surface of the disk.

6. The actuator as claimed in claim 5, wherein the inclined surface of the absorption filter is streamlined and curved.

7. A disk drive comprising:
   a spindle motor;
   at least one disk installed on the spindle motor;
   an actuator to move a read/write head for recording and/or reproducing data to a predetermined position on the disk; and
   a voice coil motor to rotate the actuator, the actuator comprising:
   a swing arm rotatably installed inside the disk drive;
   a suspension coupled with a leading end portion of the swing arm and supporting a slider with which the head is mounted; and
   an absorption filter attached with one side of the swing arm to confront an airflow in a predetermined direction according to rotation of the disk, and to absorb foreign materials in the airflow which is generated,
   wherein the absorption filter comprises a support portion attached with at least one of upper and lower surfaces of the swing arm and supporting the absorption filter and which protrudes from a rear surface of the absorption filter.

8. The disk drive as claimed in claim 7, wherein the absorption filter adheres with one side surface of the swing arm.

9. The disk drive as claimed in claim 7, wherein a height of the absorption filter is greater than a height of the side surface of the swing arm.

10. The disk drive as claimed in claim 7, wherein a surface of the absorption filter confronting the airflow in the predetermined direction is perpendicular to a surface of the disk.

11. A disk drive comprising:
   a spindle motor;
   at least one disk installed on the spindle motor;
   an actuator to move a read/write head for recording and/or reproducing data to a predetermined position on the disk; and a voice coil motor to rotate the actuator, the actuator comprising:
- a swing arm rotatably installed inside the disk drive;
- a suspension coupled with a leading end portion of the swing arm and supporting a slider with which the head is mounted; and
- an absorption filter attached with one side of the swing arm to confront an airflow in a predetermined direction according to rotation of the disk, and to absorb foreign materials in the airflow which is generated,
- wherein a surface of the absorption filter confronting the airflow in the predetermined direction is inclined with respect to a surface of the disk.

12. The disk drive as claimed in claim 11, wherein the inclined surface of the absorption filter is streamlined and curved.

13. An actuator of a disk drive having an absorption filter to absorb foreign materials inside the disk drive, the actuator comprising:
- a swing arm installed inside the disk drive; and
- a read/write head attached with an end of the swing arm, wherein the absorption filter is attached with a first surface of the swing arm not facing a disks,
- wherein
  - the absorption filter impedes an airflow including the foreign materials and the surface of the swing arm having the absorption filter faces the airflow and is positioned approximately perpendicular to a recording/reproducing surface of the disk
  - the absorption filter is attached with the swing arm using a support portion, the support portion extends from a rear surface of the absorption filter and is attached with a second surface of the swing arm to support the absorption filter, and the first surface is not substantially coplanar with the second surface.

14. The actuator of claim 13, wherein a surface of the absorption filter has a shape such that air flows smoothly around the absorption filter to reduce a generation of vibration of the disk due to vortex.

15. The actuator of claim 14, wherein the absorption filter has a uniform thickness.

16. The actuator of claim 14, wherein the first surface with which the absorption filter is attached is a side surface of the swing arm.

17. An actuator of a disk drive having an absorption filter to absorb foreign materials inside the disk drive, the actuator comprising:
- a swing arm installed inside the disk drive; and
- a read/write head attached with an end of the swing arm, wherein the absorption filter is attached with a first surface of the swing arm not facing a disk,
- wherein the absorption filter has a surface facing an airflow in the predetermined direction that is at an angle less than approximately 90 degrees relative to the reading/reproducing surface of the disk.

18. The actuator of claim 17, wherein the absorption filter is attached with the swing arm using a support portion, the support portion extends from a rear surface of the absorption filter and is attached with a second surface of the swing arm to support the absorption filter, and the first surface is not substantially copianar with the second surface.

19. An actuator of a disk drive having an absorption filter to absorb foreign materials inside the disk drive, the actuator comprising:
- a swing arm installed inside the disk drive; and
- a read/write head attached with an end of the swing arm, wherein the absorption filter is attached with a first surface of the swing arm not facing a disk,
- wherein the absorption filter has a surface facing the airflow in the predetermined direction that is curved relative to the surface of the disk.

20. The actuator of claim 19, wherein the absorption filter is attached with the swing arm using a support portion, the support portion extends from a rear surface of the absorption filter and is attached with a second surface of the swing arm to support the absorption filter, and the first surface is not substantially coplanar with the second surface.

21. An actuator of a disk drive having an absorption filter to absorb foreign materials inside the disk drive, the actuator comprising:
- a swing arm installed inside the disk drive; and
- a read/write head attached with an end of the swing arm, wherein the absorption filter is attached with a first surface of the swing arm not facing a disk,
- wherein a portion of the absorption filter extends above and connects with a second surface of the swing arm, the second surface being one of a top and a bottom surface adjacent the first surface.

22. The actuator of claim 21, wherein the absorption filter is attached with the swing arm using a support portion that extends from a rear surface of the absorption filter and is attached with the second surface of the swing arm to support the absorption filter.

23. The actuator of claim 21, wherein the absorption material has a buffering feature to alleviate vibration of the actuator in the disk drive.

* * * * *

UNITED STATES PATENT AND TRADEMARK OFFICE
CERTIFICATE OF CORRECTION

PATENT NO. : 7,336,439 B2
APPLICATION NO. : 10/868958
DATED : February 26, 2008
INVENTOR(S) : Sang-chul Shin Page 1 of 1

It is certified that error appears in the above-identified patent and that said Letters Patent is hereby corrected as shown below:

Column 10, Line 64, change "instalied" to --installed--.

Column 11, Line 23, change "disks," to --disk,--.

Column 12, Line 10, change "copianar" to --coplanar--.

Signed and Sealed this

Twenty-second Day of July, 2008

JON W. DUDAS
*Director of the United States Patent and Trademark Office*